(No Model.)  2 Sheets—Sheet 1.

C. W. SOVERHILL.
FRUIT EVAPORATOR.

No. 506,651. Patented Oct. 10, 1893.

Attest.
H. Joseph Doyle
Edwin J. Clarkson

Inventor.
Charles W. Soverhill
By E. B. Whitmore
Atty.

(No Model.) 2 Sheets—Sheet 2.

C. W. SOVERHILL.
FRUIT EVAPORATOR.

No. 506,651. Patented Oct. 10, 1893.

Attest:
M. L. McDermott
A. F. Hustle

Inventor:
C. W. Soverhill
By E. B. Whitmore, Atty

UNITED STATES PATENT OFFICE.

CHARLES W. SOVERHILL, OF NEWARK, NEW YORK, ASSIGNOR OF ONE-HALF TO CHARLES H. PERKINS AND SILAS S. PIERSON, OF SAME PLACE.

FRUIT-EVAPORATOR.

SPECIFICATION forming part of Letters Patent No. 506,651, dated October 10, 1893.

Application filed April 16, 1892. Serial No. 429,458. (No model.)

*To all whom it may concern:*

Be it known that I, CHARLES W. SOVERHILL, of Newark, in the county of Wayne and State of New York, have invented a new and useful Improvement in Fruit-Evaporators, which improvement is fully set forth in the following specification and shown in the accompanying drawings.

On April 16, 1891, I filed an application for a patent for an improved fruit evaporator the patent being issued February 9, 1892, and numbered 468,731. My present invention is an improvement on the invention shown and described in said patent, and it consists in a new and better method of supplying heated air to the fruit contained in the device to be dried.

In this invention I provide a steam heating device of novel construction and arrangement of pipes for heating and drying the air that is caused to circulate through the fruit by the action of the fan.

The invention is hereinafter fully described and particularly pointed out in the claims.

Figure 1:
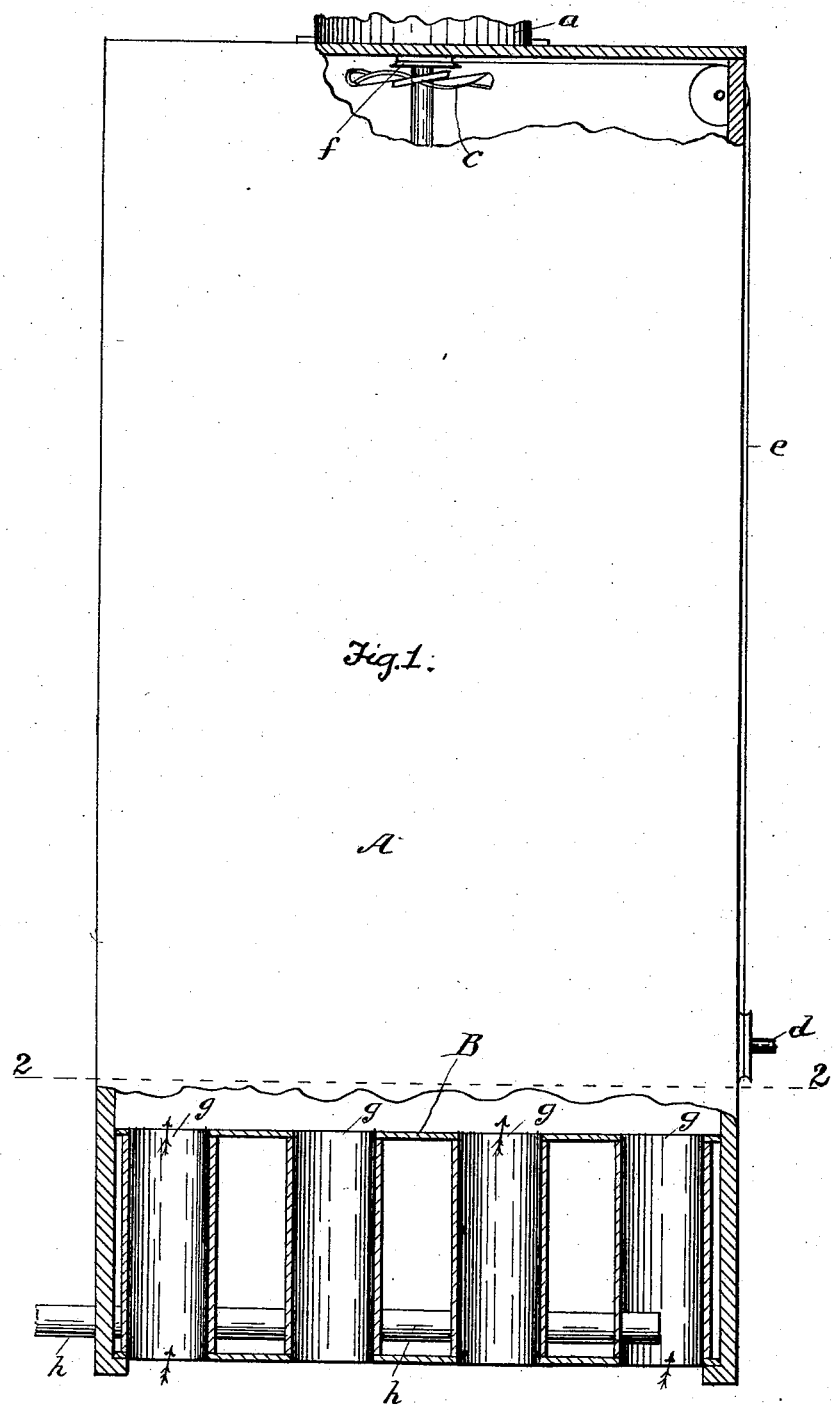
Figure 2:
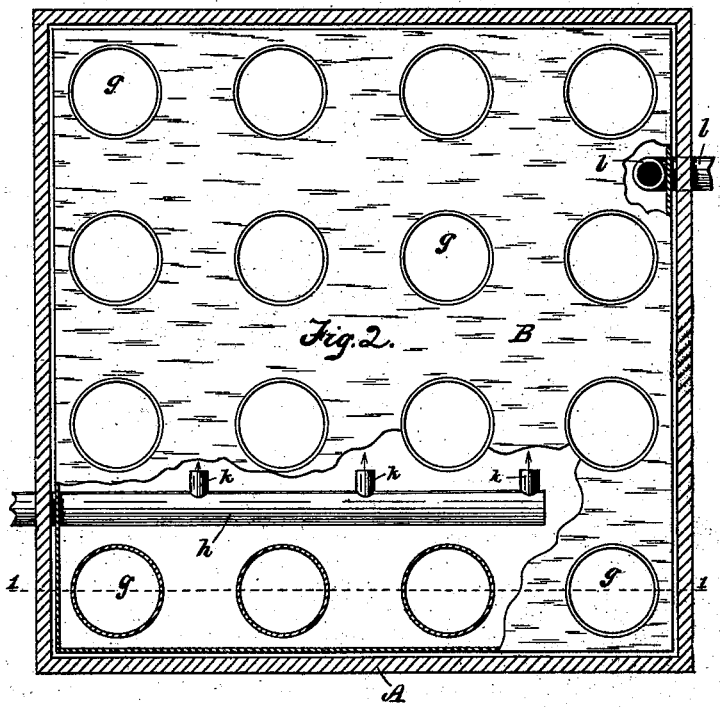
Figure 3:
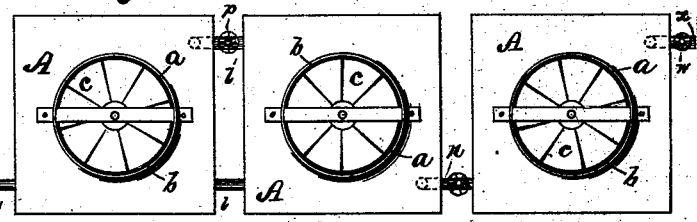
Figure 4:
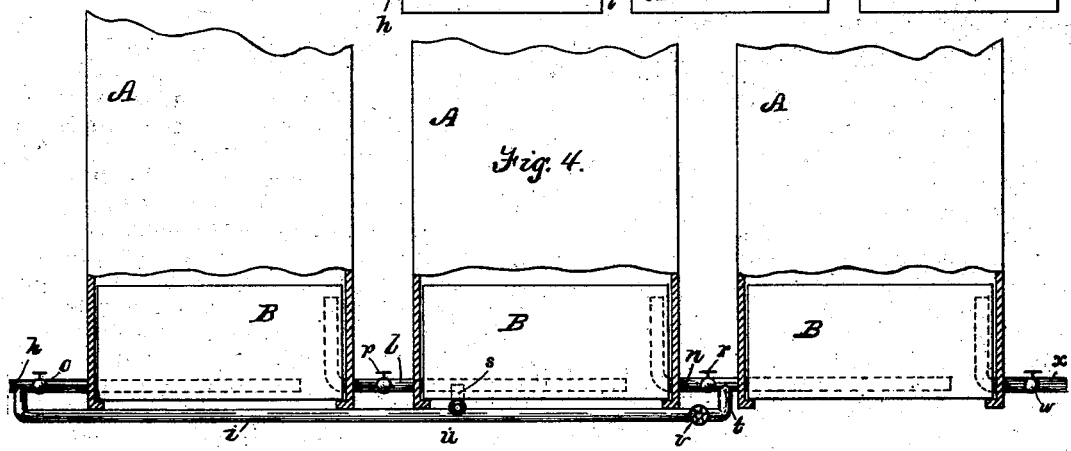

Referring to the drawings, Figure 1 is a side elevation of the evaporating tower the lower part being vertically sectioned as on the dotted line 1 1 in Fig. 2. Fig. 2, drawn to a larger scale, is a transverse section of the tower on the dotted line 2 2 in Fig. 1, parts of the upper wall of the heater being broken away. Fig. 3, drawn to a small scale, shows in plan a nest of three towers acting together. Fig. 4 is a side elevation of the lower parts of three co-acting towers partly in vertical section to show the arrangement of the heaters and connecting pipes.

Referring to the parts shown, A is the tower or casing in which the fruit to be dried is contained, the fruit being held by any desired means, the manner of holding and arranging the fruit in the towers forming no part of my present invention. The towers are usually set up inside of other buildings or inclosures and are preferably made rectangular in horizontal section and usually very much higher than the distance across the base, this distance being usually four feet more or less.

$a$ is a pipe or flue leading from an opening $b$ at the top of the tower immediately beneath which opening is a horizontally revolving fan $c$, employed to create an upward draft within the inclosure. This fan is rotated by means of a driving shaft $d$, and driving cord $e$ leading from said driving shaft onto a pulley $f$, fixed to the fan-shaft. These simple parts and devices are similar to the corresponding parts clearly shown and described in said patent of February 9, 1892.

B is the heating device or heater for the tower, which consists of a steam tight case or box provided with numerous vertical tubes $g$, the box being placed within the tower at the bottom thereof, as shown. The tubes $g$ extend through from the lower to the upper surface of the box, as shown, up through which air flows into the tower. The upflow of air into and upward through the interior of the tower is caused by both the action of the fan and from the heating of the air as it enters and flows upward through the tubes $g$. The space within the box around the tubes is filled with steam admitted through pipes $h$ $i$.

Usually with these evaporating establishments there is employed a small steam motor for running the pairing machines and doing other work and the main steam pipe $h$ for the steam boxes is connected with the steam generator or some convenient steam pipe or other steam-filled chamber.

Where two or more towers are used together, as shown in Figs. 3 and 4, I generally prefer to arrange them as shown and connect the heaters for the towers with steam pipes as shown and hereinafter described.

The main steam pipe $h$ leads into the first steam box (the one at the left as appearing in Fig. 4) preferably at one side thereof and near the bottom, as shown. I generally prefer to close the inner end of this pipe and provide it with short horizontal lateral branches $k$ to more equally distribute the flowing steam among the tubes $g$. Within this steam box I place a stand pipe $l$, shown in Figs. 2 and 4, offset from the pipe $h$ and at the side of the box opposite that at which the pipe $h$ enters. At its lower end this stand pipe is turned horizontally outward and caused to enter the next steam box in a manner similar to that in which the pipe $h$ enters the first steam box. Within the second steam box I place a similar stand pipe $n$, and cause it to enter the third steam box in the series in the same manner the stand pipe $l$ enters the second steam box. I provide the pipes $h, l$ and $n$ with gates $o \ p \ r$ respectively. Now, if all three gates $o \ p \ r$ are opened the steam will flow through the pipe $h$ into the first steam box, thence through the pipe $l$ into the second steam box and finally into the third steam box through the pipe $n$. By this means all three steam boxes with their tubes $g$ are heated causing the air which flows upward into the several towers to be heated. In using a nest of these towers for evaporating fruit it frequently occurs that the fruit in the various towers dries unevenly, from different causes. On account of this I have arranged the pipes so that new steam from the generator may be admitted directly into either one of the steam boxes as may be required.

As shown, the branch pipe $i$ takes steam from the main pipe $h$ at a point between the generator and the gate $o$. This branch pipe connects, at $s$, with the second steam box and at $t$, with the pipe $n$ that enters the third steam box. The pipe $s$ is provided with a gate $u$ and the pipe $i$ is provided with a gate $v$, as shown in Fig. 4.

Now, in practice, if there should be for instance at any time fruit in the first tower only the gates $p, s$ and $v$ would be closed and the gate $o$ opened. This would admit steam into the steam box of the first tower only. Should there be fruit in second tower also to be dried the gate $p$ would be opened to allow steam to flow from the first box in to the second one. Should there be fruit in all the towers all three of the gates $o, p$ and $r$ are opened. In this case the steam filling the first box passes through the pipe $l$ into the second box and thence through the pipe $n$ into the third box. Thus arranged the greatest amount of heat would, of course, be communicated to the first steam box, less to the second box and least of all to the third. Should it be wished to convey more heat to the third steam box the gate $v$ in the branch pipe $i$ would be opened, wholly or partially, as the requirement of the case might determine. Also if additional heat be required for the second steam box the gate $u$ would be opened to allow a flow of new steam into it through the pipe $s$. Should there be fruit only in the third tower all the gates are closed except $v$; and, likewise, should there be fruit only in the second tower to be dried all the gates are closed but $u$. On account of this arrangement of the pipes the heat conveyed to any of the towers by means of the steam pipes may be conveniently regulated to suit any given case. The drip caused from the condensation of steam is conveyed back to the generator or otherwise disposed of by means that are common and involving no invention.

In case these towers are to be used for cooling purposes as for cooling dairy products, for instance, during the summer season cold water is made to take the place of the steam, filling the boxes to the level of the top of the stand pipes. On account of this use of the apparatus the third box is provided with an exhaust stand pipe $x$ similar to $n$ and $l$ and provided with an exit gate $w$. This pipe $x$ is commonly not brought into use when the apparatus is used as a fruit drier and the box filled with steam.

It will be understood that the tower may be made horizontal instead of vertical, as shown, the steam box being at one end, with the fan and exit opening at the opposite end. Such a construction of the device would not of course depart from the spirit of the invention herein described and shown.

What I claim as my invention is—

1. A fruit drying apparatus consisting of a series of towers arranged side by side upon the ground each formed with an opening at the top and a revolving fan beneath the opening, in combination with a steam heating box at the base of the tower, an inlet steam pipe for the first heating box, a separate steam pipe connecting the first heating box with the second heating box, a separate steam pipe connecting the second heating box with the third heating box, and so on through the series, each of said connecting pipes being formed with a vertical part in the first of the two boxes connected, and a horizontal part in the remaining box of the two connected, the horizontal part of each pipe being provided with a gate, substantially as shown and described.

2. A fruit drying apparatus consisting of a series of towers arranged side by side upon the ground each formed with an opening at the top and a revolving fan for the opening, in combination with a steam heating box at the base of the tower, a general supply steam pipe entering the first heating box, a second pipe connecting the first and the second heating boxes, a third pipe connecting the second and the third heating boxes, and so on through the series, each of said connecting pipes being formed with a vertical part in the first of the two boxes connected, and a horizontal part in the remaining box of the two connected, the horizontal part of each pipe being provided with a gate, and a secondary supply pipe connecting said last named connecting pipe for the boxes with said general supply pipe, provided with a gate and having lateral pipes, each provided with a gate, leading into the respective main steam boxes of the series, substantially as and for the purpose specified.

In witness whereof I have hereunto set my hand, this 9th day of April, 1892, in the presence of two subscribing witnesses.

CHARLES W. SOVERHILL.

Witnesses:
LUCINDA J. SOVERHILL,
ROBERT M. SOVERHILL.